(12) United States Patent
Bahadik et al.

(10) Patent No.: US 8,975,769 B2
(45) Date of Patent: Mar. 10, 2015

(54) ELECTROMAGNETIC FIELD AND CURRENT INDUCING SURFBOARD FOR REPELLING SHARKS

(76) Inventors: Mountaser Mosaad Bahadik, Daytona Beach, FL (US); Torrey Frank Theall, Daytona Beach, FL (US)

( * ) Notice: Subject to any disclaimer, the term of this patent is extended or adjusted under 35 U.S.C. 154(b) by 468 days.

(21) Appl. No.: 13/478,908

(22) Filed: May 23, 2012

(65) Prior Publication Data

US 2013/0314044 A1  Nov. 28, 2013

(51) Int. Cl.
F03B 13/12 (2006.01)

(52) U.S. Cl.
USPC .............................................. 290/53; 290/1 R (58) Field of Classification Search
USPC ................. 290/1 R, 42, 53; 119/220
See application file for complete search history.

(56) References Cited

U.S. PATENT DOCUMENTS

| | | | | |
|---|---|---|---|---|
| 6,461,204 B1* | 10/2002 | Takura et al. | ........................ | 440/6 |
| 6,798,090 B2* | 9/2004 | Cheung et al. | ..................... | 310/17 |
| 6,809,427 B2* | 10/2004 | Cheung et al. | ................... | 290/1 R |
| 8,022,563 B2* | 9/2011 | Lemieux | ............................ | 290/42 |
| 8,306,673 B1* | 11/2012 | Manning | ............................. | 701/1 |
| 2003/0051674 A1 | 3/2003 | Leblanc | | |
| 2009/0038205 A1 | 2/2009 | Stroud | | |
| 2012/0199079 A1* | 8/2012 | Cheron et al. | .................. | 119/220 |

FOREIGN PATENT DOCUMENTS

WO   2007/106230   9/2007

OTHER PUBLICATIONS

Shark Shield Pty Ltd., "SharkShield 'proven protection'", http://sharkshield.com/assets/attachments/blog_item/4/8860-instructions_screen_1.2.pdf.
X-Ray Mag, "New Fishing Hook Reduces Shark Catch" http://www.xray-mag.com/content/new-fishing-hook-reduces-shark-catch, Dec. 10, 2011.
WESH.com, "New Surf Board Supposed to Repel Sharks" "Local Man Creates Shark-Safe Surf Board", http://www.wesh.com/news/922291/detail.html, Aug. 16, 2001.
Craig P. O'Connell et al., "Analysis of permanent magnets as elasmobranch bycatch reduction devices in hook-and-line and longline trials" Fishery Bulletin 109:394-401 (2011).

* cited by examiner

Primary Examiner — Tulsidas C Patel
Assistant Examiner — Viet Nguyen
(74) Attorney, Agent, or Firm — Oblon, McClelland, Maier & Neustadt, L.L.P.

(57) ABSTRACT

An electromagnetic field and electrical current inducing surfboard and associated methodology for inducing an electromagnetic field in the area surrounding a surfboard. The surfboard includes at least one induction unit having a magnet and coil winding section. The magnet is arranged such that it is surrounded by the coil winding section and such that it is permitted to move freely within an area inside the coil winding section. Relative motion between the magnet and coil windings is caused by rotating the surfboard about any axis. The relative motion between the magnet and coil windings results in an induced electromagnetic field. Additionally, connecting the induction unit to an electrical circuit results in an induced current flowing from the induction unit.

8 Claims, 12 Drawing Sheets

| Power Level | Antenna Status | | Coils | Duty Cycle |
|---|---|---|---|---|
| | Loop 1 | Loop 2 | | |
| 100% | ON | ON | ON | 100% |
| 75% | ON | OFF | ON | 100% |
| 50% | ON | OFF | ON | 50% |
| 25% | OFF | ON | ON | 50% |
| 0% | OFF | OFF | ON | 0% |

ELECTROMAGNETIC FIELD AND CURRENT INDUCING SURFBOARD FOR REPELLING SHARKS

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND OF THE INVENTION

1. Field of the Invention

This disclosure relates to a surfboard apparatus and associated methodology for inducing an electromagnetic field and current with which to repel sharks.

2. Description of the Related Art

Surfing in an incredibly popular sport that attracts many thousands of people to the ocean waters across the globe. Because of the nature of the sport and the sheer amount of time spent in the ocean while participating in it, surfers are particularly vulnerable to shark attacks. While shark attacks are rare relative to the total number of surfers, the risk of serious injury or death is strong enough that a lingering fear of attack is always present for those entering the ocean.

In response to the commonly held fear of shark attacks, many methods and devices have been developed for repelling sharks. Of the known inventions, many rely on sharks' biological sensitivity to electromagnetic fields and the tendency for sharks to avoid areas in which higher-than-normal electromagnetic fields are present.

Sharks have a natural sensitivity for electromagnetic fields because they possess field receptors known as ampullae of Lorenzini. The ampullae of Lorenzini normally enable sharks to detect the presence of weak electromagnetic fields which are generated naturally by other life forms in the water. However, studies show that a strong electromagnetic field can effectively overwhelm the receptors, thereby causing any sharks in the presence of the field to be quickly repelled.

Known shark repellant devices have exploited sharks' heightened sensitivity to electromagnetic fields by incorporating various forms of electromagnetic field induction. However, the known devices rely on a dedicated external power source, such as a battery, for inducing the field. The shortcoming of such a system is that a failure of the external power source will prevent an electromagnetic field from being induced, consequently leaving users vulnerable to shark attacks.

For the above-noted reasons, an apparatus for inducing a magnetic field without an external power source is needed.

SUMMARY

The present invention describes an apparatus and associated methodology for inducing an electromagnetic field around a surfboard for repelling sharks. An exemplary embodiment of the present invention uses one or more induction units, which are integrated into a surfboard and are configured to induce a magnetic field and electrical current without the use of a dedicated power circuit.

The induction units of the exemplary embodiment use the motion of internal magnets relative to a coil winding of conductive wire for inducing the electromagnetic field. By arranging the internal magnets such that they are free to move within the induction unit relative to a coil winding, the kinetic energy of ocean waves on which a surfboard is floating causes the magnets to move relative to the coil windings, which provides the source of the electromagnetic field.

By connecting the conductors of the coil windings to an electrical circuit, the induction units can also utilize the above-mentioned translation of ocean wave kinetic energy for inducing an electrical current. In particular, the induction units may optionally be configured to supply an induced electrical current for the purposes of providing a power source to an electromagnetic field transmission unit, such as a dipole antenna.

A control circuit may also be incorporated for directing the current induced in the exemplary embodiment to power the electromagnetic field transmission unit and/or charge a backup direct current (DC) battery. The control circuit is configured to sense the induced current and associated induced voltage for comparison with a predetermined threshold value. The threshold value corresponds to the voltage required by the electromagnetic field transmission unit to generate a magnetic field. When the induced voltage exceeds the threshold, the control circuit directs the required current to the electromagnetic field transmission unit in order to produce the magnetic field. Any current in excess of that which is required by the electromagnetic field transmission unit is directed by the control circuit to charge the battery.

Conversely, when the control circuit determines that the induced voltage is below the level required by the electromagnetic field transmission unit for generating an electromagnetic field, the control circuit determines a compensating voltage and adjusts the battery output such that the battery may supply the deficit voltage.

As will be described in further detail below, a system including the features described above provides an effective way for surfers to ward off potential shark attacks while eliminating the need to rely on a dedicated power circuit for inducing an electromagnetic field.

Although a surfboard is an exemplary structure, the system also works well when incorporated into the hull of a boat, such as a sailboat or motor boat, or other water craft such as a kayak. In particular, the invention may be useful to ward off sharks when swimmers are in the water surrounding a boat. In this scenario, the present invention would create a safety area in which sharks are repelled away from the swimmers.

The foregoing "background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advance

DETAILED DESCRIPTION OF THE EMBODIMENTS

Referring now to the drawings, wherein like reference numerals designate identical or corresponding parts throughout the several views, the following description relates to a shark repellant surfboard and associated methodology for inducing an electromagnetic field and electrical current for repelling sharks.

Specifically, as shown in the drawings and related discussion, as wave motion causes a magnet or magnetic material, such as a ferrous metal, to move relative to a coil winding section within an induction unit of the shark repellant surfboard, the relative motion between the magnet and the coil winding induces an electromagnetic field in the area surrounding the surfboard. When a shark enters the area in which an electromagnetic field is induced surrounding the surfboard, the shark's electroreceptors become overwhelmed, thereby causing sharks in the surrounding area to be repelled.

When the conductors of a coil winding in the induction unit of an exemplary embodiment are connected to a power control circuit, the relative motion between the magnets and coil windings caused by a surfboard's movement in the ocean results in a current being induced in the coil winding conductors. The induced current and associated voltage induced by the surfboard induction units can be optionally used to drive an electromagnetic field transmission unit and/or a backup DC battery source. The backup DC battery source may be used to store energy for later use. The electromagnetic field transmission unit may optionally include an antenna and associated circuitry for outputting an electromagnetic field around a surfboard.

Figure 1A:
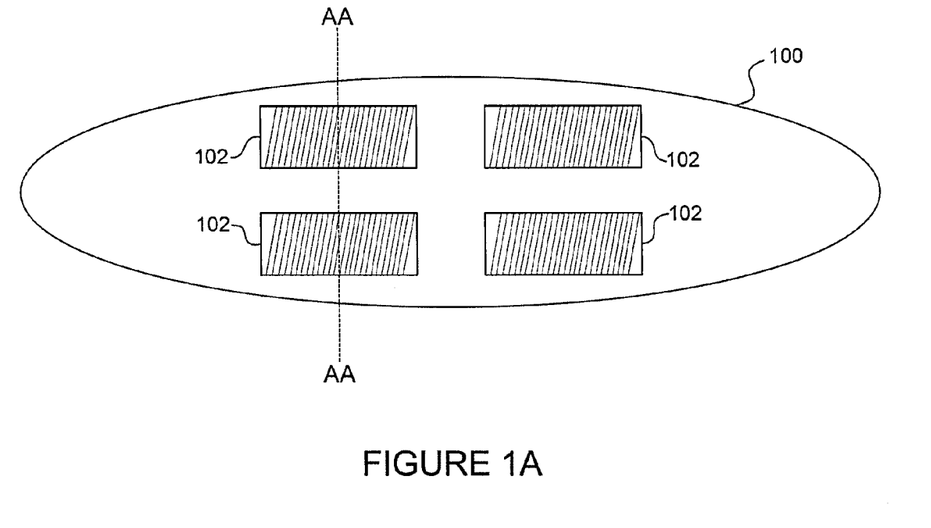
- FIG. 1A is a schematic diagram of a shark repellant surfboard according to an exemplary embodiment.

Referring to the drawings, FIG. 1A is a schematic diagram of a shark repellant surfboard according to an exemplary embodiment. FIG. 1A shows a top view of the shark repellant surfboard which includes a body section 100 and an induction unit 102. As shown in FIG. 1A, one of ordinary skill in the art may optionally include a plurality of induction units (four are shown, but anywhere from 1 to 100 may be used) depending on the desired strength of electromagnetic field to be generated and also with consideration to buoyancy concerns. Body section 100 is made of any buoyant material in which a conventional surfboard is constructed, such as polystyrene foam covered in fiberglass. In an exemplary embodiment, induction unit 102 is comprised of a hollowed cylindrical insulator section and a coil winding section surrounding the insulator. Induction unit 102 also includes a magnet which will be discussed in greater detail below. The size, arrangement, and material selection with respect to the induction unit is determined by one of ordinary skill in the art with considerations of buoyancy and the strength of desired electromagnetic field. However, in an exemplary embodiment induction unit 102 has a coil winding section of copper conductor surrounding an insulator.

Figure 1B:
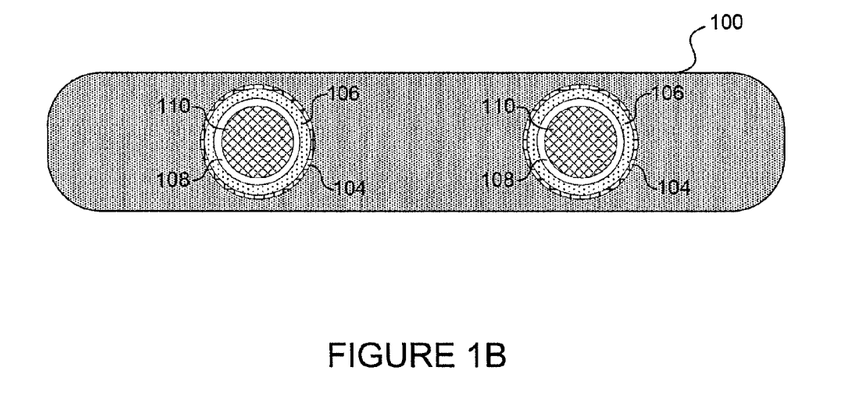
FIG. 1B is a cross-sectional view of a shark repellant surfboard according to an exemplary embodiment.

Referring to FIG. 1B, FIG. 1B shows a cross-sectional view along section AA of the shark repellent surfboard illustrated in FIG. 1A. As shown in FIG. 1B, body section 100 includes at least one hollowed portion in which an induction unit may be placed. In an exemplary embodiment, induction unit 102 includes coil winding section 104, insulator section 106, channel section 108, and magnet 110. In the exemplary embodiment, magnet 110 is placed inside of a hollowed cylindrical insulator section 106 such that the magnet is permitted to freely move inside a channel section 108 as the shark repellant surfboard moves about any axis. Magnet 110 should be of sufficient length and diameter such that it is permitted to freely move within the induction unit relative to coil winding section 104. The relative motion between magnet 110 and coil winding section 104 induces an electromagnetic field, which surrounds the surfboard and thereby creates an area in the surrounding ocean waters in which sharks are repelled.

Figure 2A:
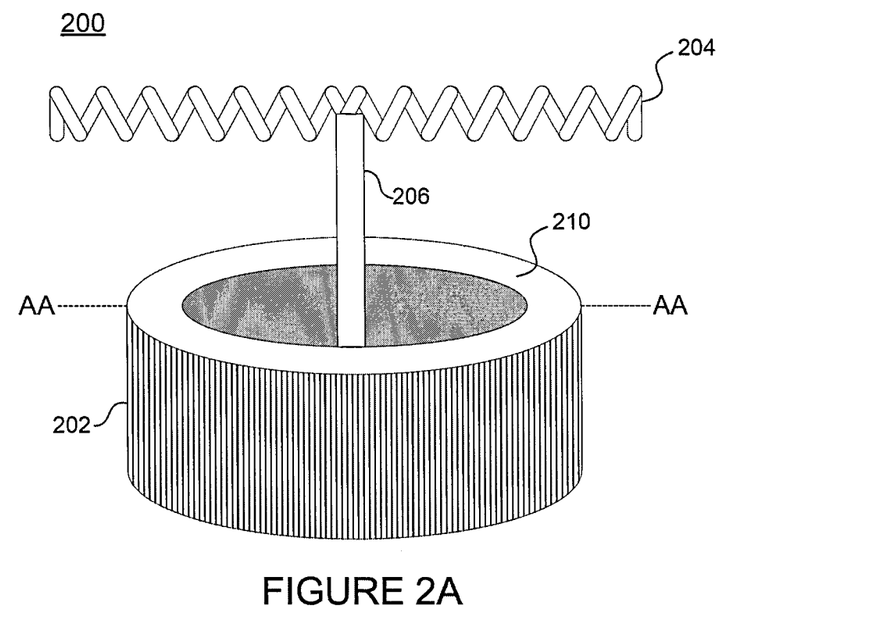
FIG. 2A is a schematic diagram of an induction unit according to an exemplary embodiment.

Referring to FIG. 2A, FIG. 2A illustrates an alternative arrangement of an induction unit according to another exemplary embodiment. FIG. 2A includes induction unit 200 comprised of coil winding section 202, spring section 204, pendulum arm 206, and insulator section 210. In the embodiment according to FIG. 2A, spring section 204 is of sufficient tension and arranged such that the pendulum arm 206 is permitted to freely move in a direction normal to the spring section 204 as the shark repellant surfboard pitches and rolls atop the ocean surface. Additionally, insulator section 210 and associated coil winding section 202 should have sufficient internal radius such that pendulum arm 206 is permitted to freely rotate and swing within the hollowed portion of the induction unit.

Figure 2B:
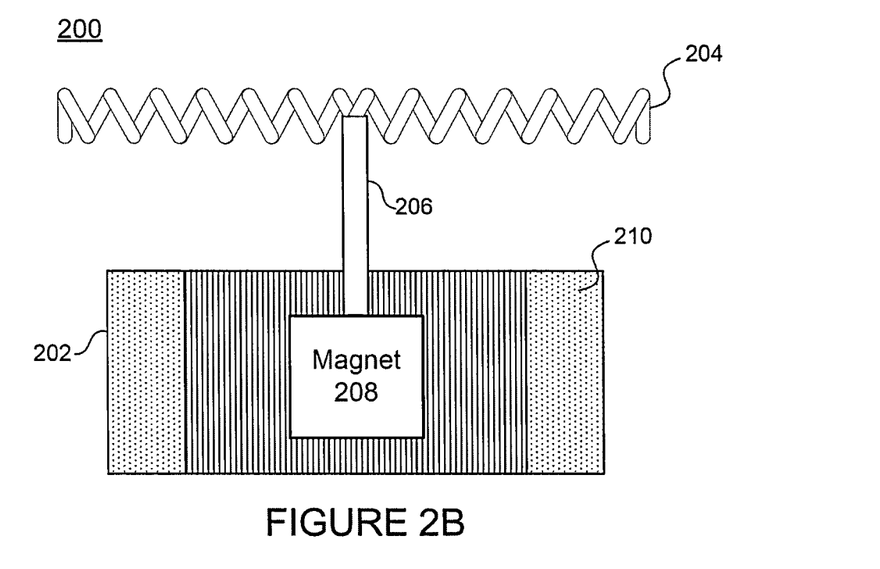
FIG. 2B is a cross-sectional view of an induction unit according to an exemplary embodiment.

FIG. 2B illustrates a cross-sectional view of induction unit 200. As shown in FIG. 2B, magnet 208 is attached to one end of pendulum arm 206. The movement of the shark repellant surfboard according to an exemplary embodiment as it sits atop the ocean surface results in magnet 208 rotating relative to coil winding section 202. As discussed above, the relative motion between magnet 208 and coil winding section 202 results in induced electromagnetic field surrounding the shark repellant surfboard. The strength of the induced magnetic field will be proportional to the strength of magnet 208 as well as the speed of relative motion between magnet 208 and coil winding section 202. The selection of materials for magnet 208 should be made with considerations of strength of electromagnetic field as well as buoyancy concerns for the shark repellant surfboard.

Figure 10:
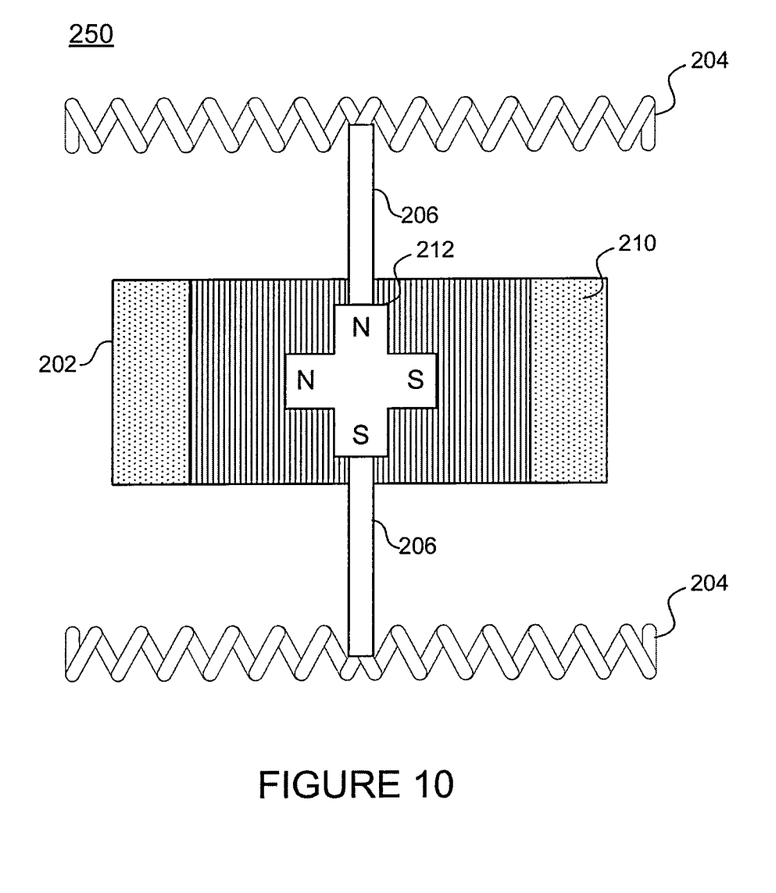
FIG. 10 is a cross-sectional view of an induction unit according to an alternate exemplary embodiment.

Another alternative arrangement of a induction unit according to another exemplary embodiment is depicted if FIG. 10. FIG. 10 illustrates a cross-sectional view of induction unit 250. Induction unit 250 includes pendulum arm 206, spring section 204, coil winding section 202, and insulator section 210, which are similar to those described above for FIGS. 2A and 2B. The alternate exemplary embodiment of FIG. 10 includes two sets of spring sections and pendulum arms, which are attached to opposing sides of cross magnet 212. As in FIGS. 2A and FIGS. 2B, the motion of the surfboard on ocean waves creates kinetic energy which is translated to magnet 212. Magnet 212 moves within insulator section 210, thereby inducing an electromagnetic field via relative motion between magnet 212 and coil winding section 202.

Figure 11A:
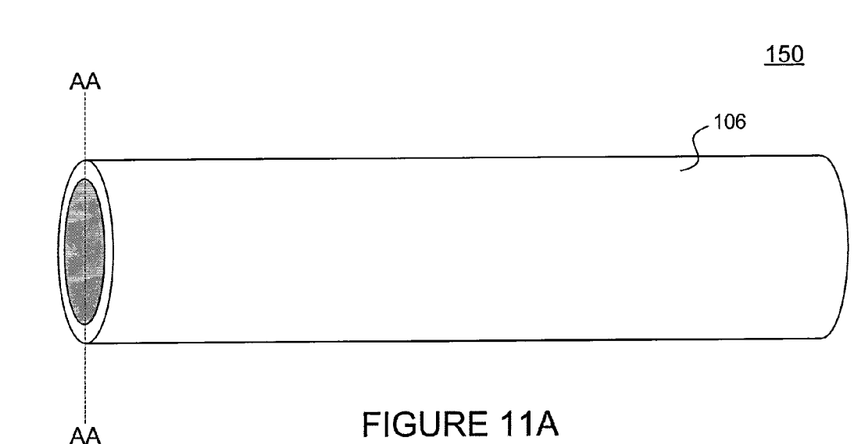
FIG. 11A is a schematic diagram of an induction unit according to an alternate exemplary embodiment.
Figure 11B:
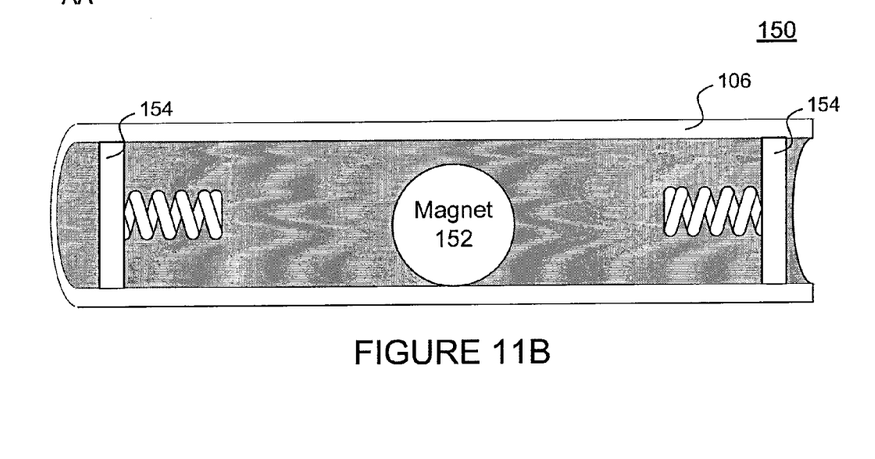
FIG. 11B is a cross-sectional view of an induction unit according to an alternate exemplary embodiment.

Another alternative arrangement of a induction unit according to another exemplary embodiment is depicted if FIGS. 11A and 11B. FIG. 11A illustrates induction unit 150 and FIG. 11B illustrates a cross-sectional view of induction unit 150 along AA. Induction unit 150 includes insulator section 106, which is similar to that shown in FIG. 1B. A coil winding section similar to that shown in FIG. 1B surrounds insulator section 106, but for simplification the coil windings are excluded from FIGS. 11A and 11B.

Referring to FIG. 11B, induction unit 150 includes a magnet 152 and spring sections 154. The motion of ocean waves moves magnet 152 within induction unit 150, which results in an electromagnetic field being induced as described above. A spring section 154 is included at opposing ends of the induction unit 150 such that additional magnet motion is created when the magnet contacts the spring. In a non-limiting example, multiple units of induction unit 150 would be arranged within a surfboard body such that the induction units are oriented along different axes with respect to the surfboard body. Thus, motion of the surfboard relative to any axis due to pitch, roll, etc. of the surfboard body would result in magnet motion. One of ordinary skill in the art may also optionally include a lubricating fluid or other means to reduce friction between magnet 152 and the internal portion of insulator section 106.

For simplicity, the following paragraphs refer to a generic induction unit 300 to describe the features and functionality of the present invention. One of ordinary skill in the art may select any of the above-described non-limiting embodiments, or combinations thereof, to form induction unit 300.

Figure 3:
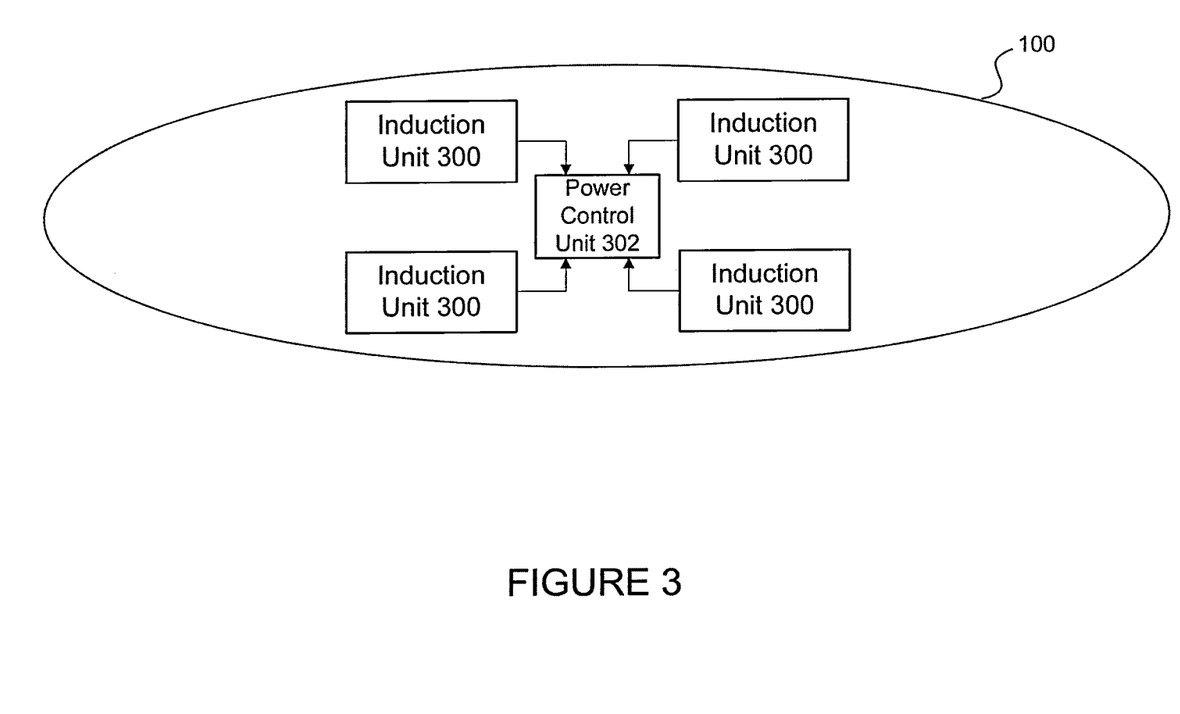
FIG. 3 is a schematic diagram of a shark repellant surfboard according to an exemplary embodiment.

Referring to FIG. 3, FIG. 3 illustrates a shark repellent surfboard according to an additional embodiment. FIG. 3 illustrates body section 100, induction unit 300, and power control unit 302. Induction unit 300 may be comprised of any arrangement of coil windings and magnet, such as the exemplary induction units of FIGS. 1A-2B, such that the magnet is permitted to freely move relative to the coil windings and induce a magnetic field as discussed above. The operation of power control unit 302 will now be discussed in further detail with reference to FIGS. 4-6.

Figure 4:
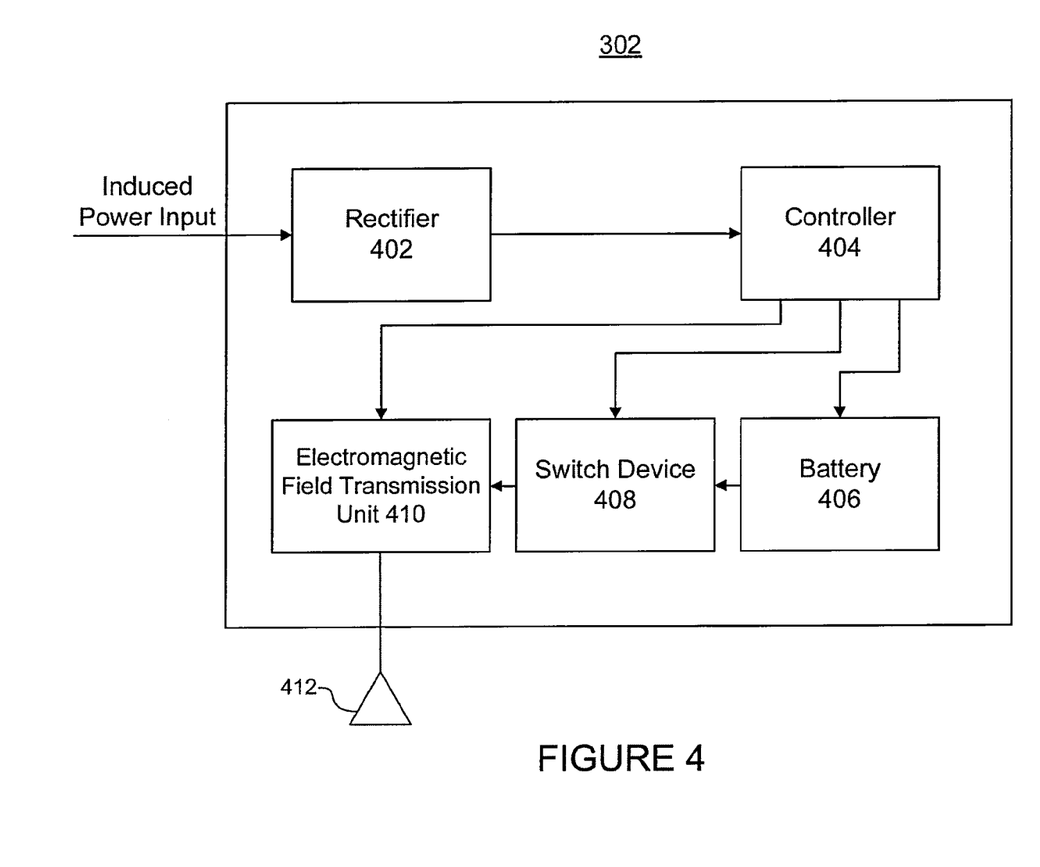
FIG. 4 is a schematic flow diagram of a power control unit according to an exemplary embodiment.

FIG. 4 is a schematic diagram of power control unit 302 according to an exemplary embodiment. Power control unit 302 includes rectifier 402, controller 404, battery 406, switch device 408, electromagnetic field transmission unit 410, and antenna 412. Rectifier 402 receives an induced current and associated voltage input from induction unit 300. Rectifier 402 converts the induced power input to a rectified direct current output voltage. The rectified DC output from rectifier 402 may then be used as an input to battery 406 and/or electromagnetic field transmission unit 410. Electromagnetic field transmission unit 410, in association with antenna 412, generates an electromagnetic field in the water surrounding the shark repellant surfboard of an exemplary embodiment. Battery 406 provides a steady direct current output for use when the rectified output voltage is insufficient for generating an electromagnetic field using electromagnetic field transmission unit 410. Switch device 408 is a conventional switching unit for use when the output from battery 406 is not required. The operation of controller 404 will now be discussed in greater detail with reference to FIG. 5.

Figure 5:
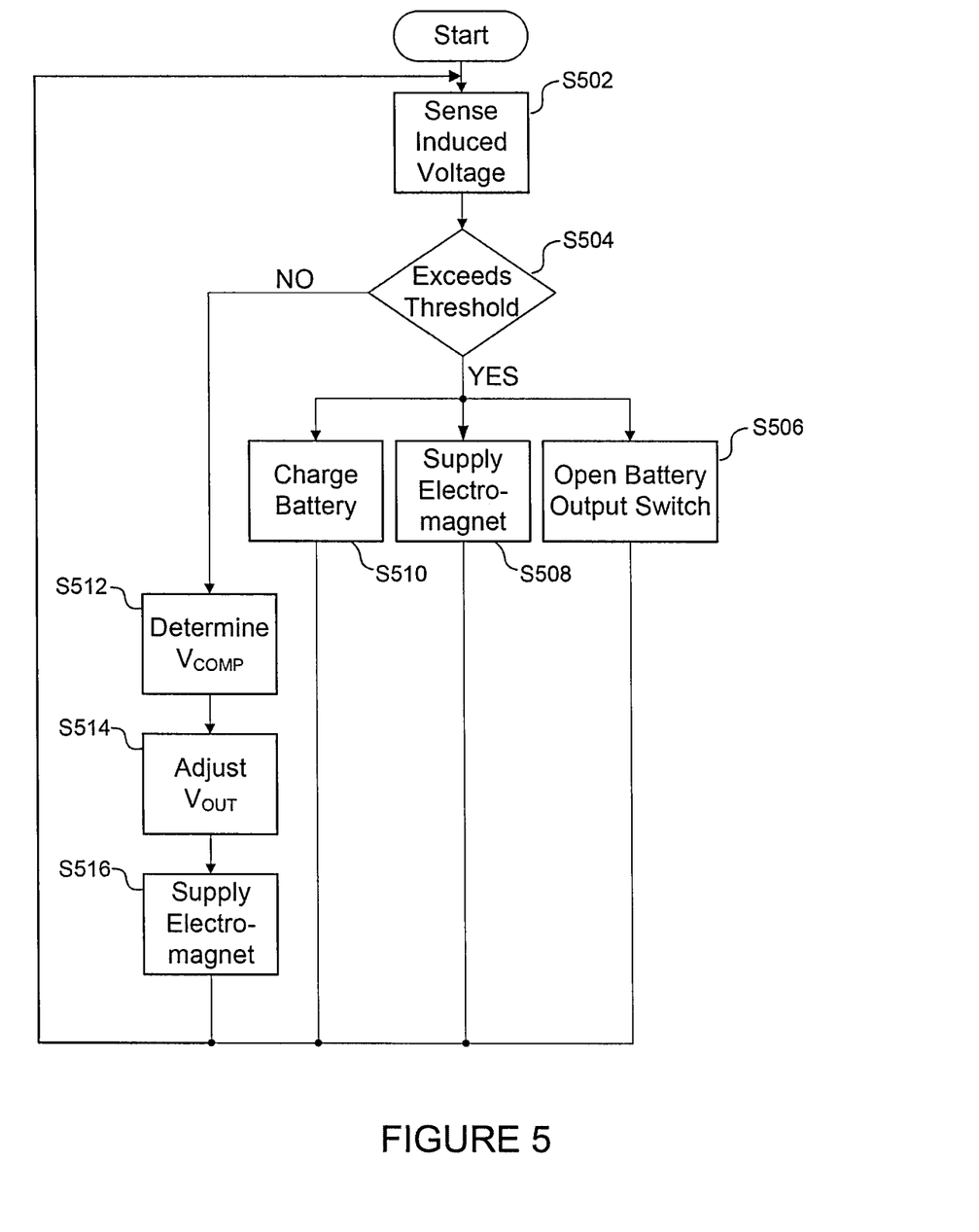
FIG. 5 is an algorithmic flow chart for a power control unit according to an exemplary embodiment.

Referring to FIG. 5, controller 404 senses the induced voltage which was converted to a direct current output by rectifier 402. If the induced output voltage from rectifier 402 is greater than a predetermined threshold which corresponds to the voltage required by electromagnetic field transmission unit 410 for generating an electromagnetic field, controller 404 directs the induced current and associated voltage to electromagnetic field transmission unit 410 for creating the electromagnetic field in the surrounding ocean waters. At step S504, controller 404 also determines if any excess voltage and current is present which is not needed by electromagnetic field transmission unit 410 to create the electromagnetic field. Any excess voltage and current is directed by controller 404 to battery 406 for use in charging the backup direct current source. Additionally, when the induced voltage is in excess of the predetermined threshold, controller 404 opens the switch included in switch device 408, which results in an open circuit at the output of battery 406. If at step S504 controller 404 determines that the induced voltage is less than the predetermined threshold corresponding to the power required by electromagnetic field transmission unit 410 to generate an electromagnetic field, controller 404 determines a compensating voltage which corresponds to the deficient voltage level needed in order to effectively produce the electromagnetic field. The compensating voltage is equivalent to the voltage required by electromagnetic field transmission unit 410 minus the predetermined threshold value. Once the compensating voltage is determined at step S512, controller 404 adjusts the voltage output of battery 406 such that the output is equal to the compensating voltage level. Additionally, controller 404 sums the compensating output voltage provided by battery 406 with the rectified voltage output from rectifier 402. Thus, the summed voltage output should at least equal the required voltage for generating an electromagnetic field using electromagnetic field transmission 410 in conjunction with antenna 412. Steps S512-S516 may occur as a feedback loop, as illustrated in FIG. 6.

Figure 6:
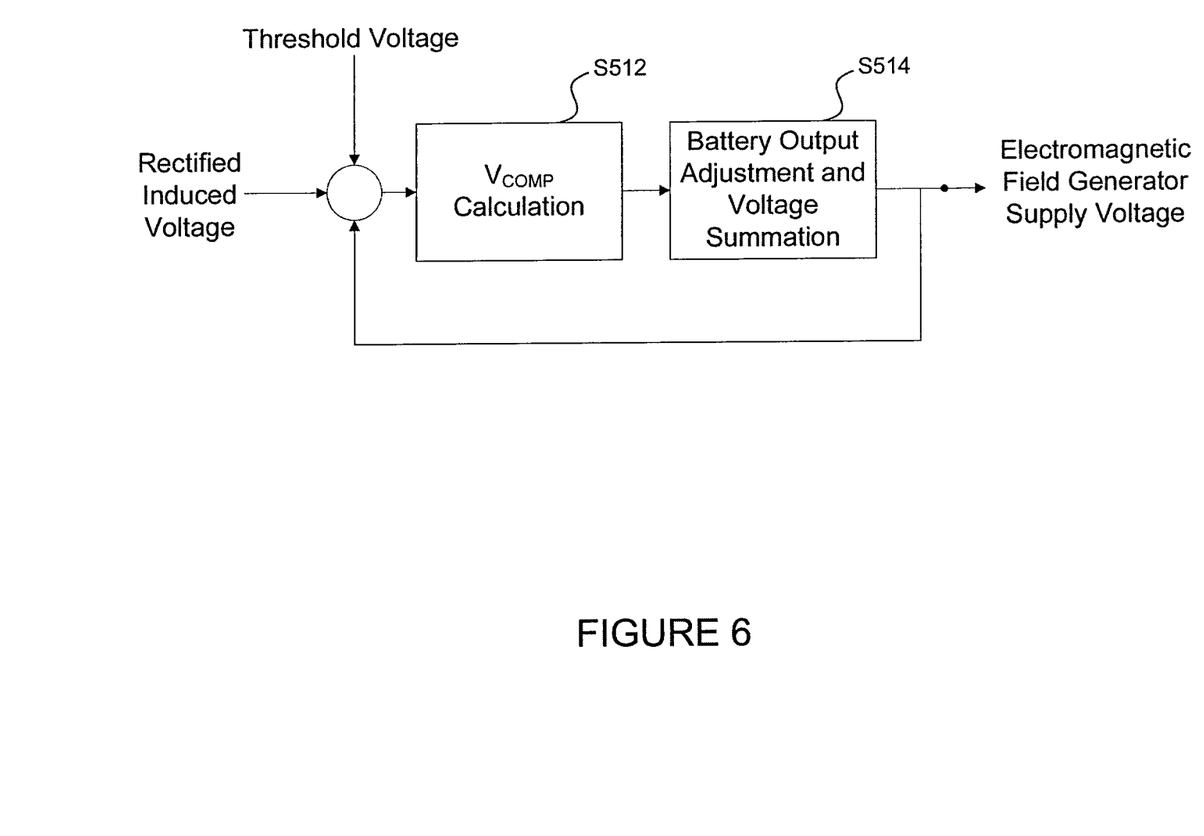
FIG. 6 is a feedback diagram for a power control unit according to an exemplary embodiment.

FIG. 6 illustrates the feedback operation of determining a compensating voltage and the summation of the compensating voltage with the induced voltage output from rectifier 402. As shown in FIG. 6, the rectified induced voltage is received at controller 404 and compared with a threshold voltage corresponding to the voltage required by electromagnetic field transmission unit for generating an electromagnetic field in the surrounding ocean waters. When controller 404 determines that the rectified induced voltage is less than a threshold voltage value, a compensating voltage level is calculated at step S512. The compensating voltage is then supplied by battery 406. The combination of the voltage output by battery 416 combined with the rectified induced voltage output from rectifier 402 is used at step S514 to supply electromagnetic field transmission unit 410.

In another embodiment, power control unit 304 may also include an external power connection which allows a user to charge battery 406 using a conventional AC power outlet. Additionally, a user controlled switch may be installed such no electromagnetic field is generated during external battery charging or when the surfboard is not in use. Power control unit 304 may be further configured to sense when the surfboard is not in use, e.g., based on the absence of internal magnet movement, in which case power control unit 304 may be placed in a standby mode or powered off.

Figure 7A:
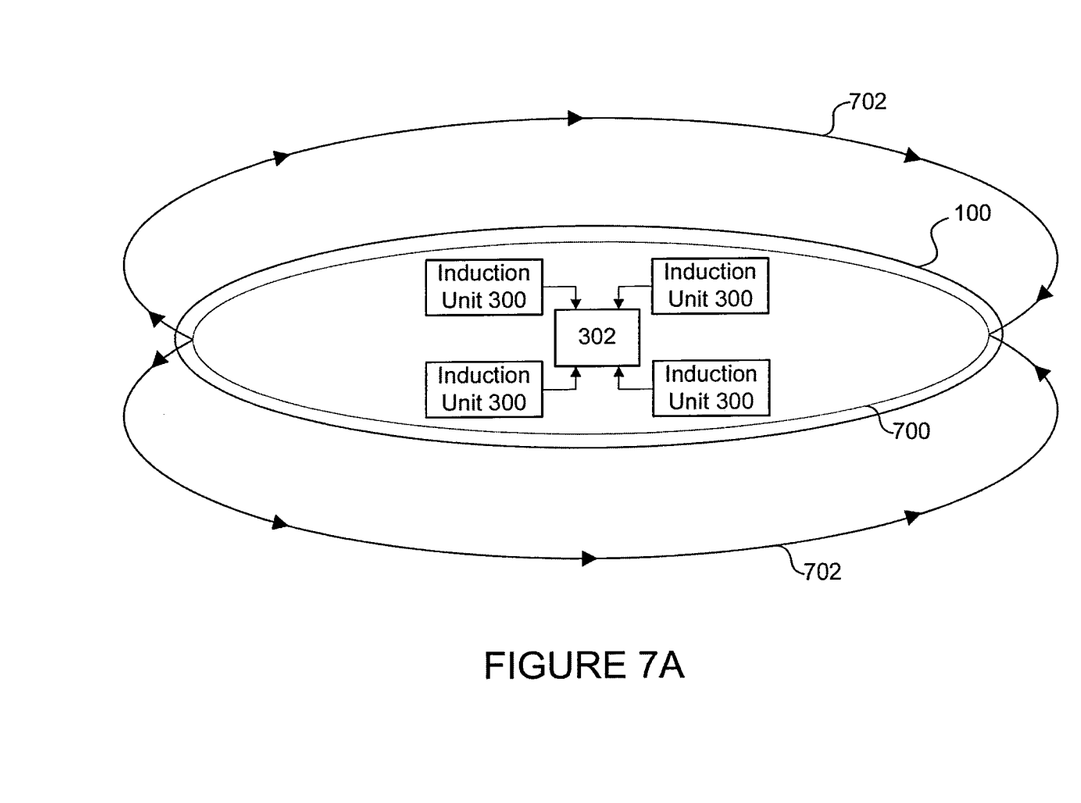
FIG. 7A is a schematic diagram of a shark repellant surfboard according to an exemplary embodiment.

FIG. 7A illustrates the combined operations of exemplary power control unit 302 and exemplary induction section 300 to produce an electromagnetic field in the surrounding ocean waters. As shown in FIG. 7A, the induced voltage and current output from induction section 300 and/or the compensating voltage output from power control unit 302 induces an electromagnetic field 702 in the surrounding ocean waters using antenna 700. FIG. 7A illustrates an exemplary arrangement of antenna 700. One of ordinary skill in the art may arrange antenna 700 such that the desired magnetic field strength and direction are obtained.

Figure 7B:
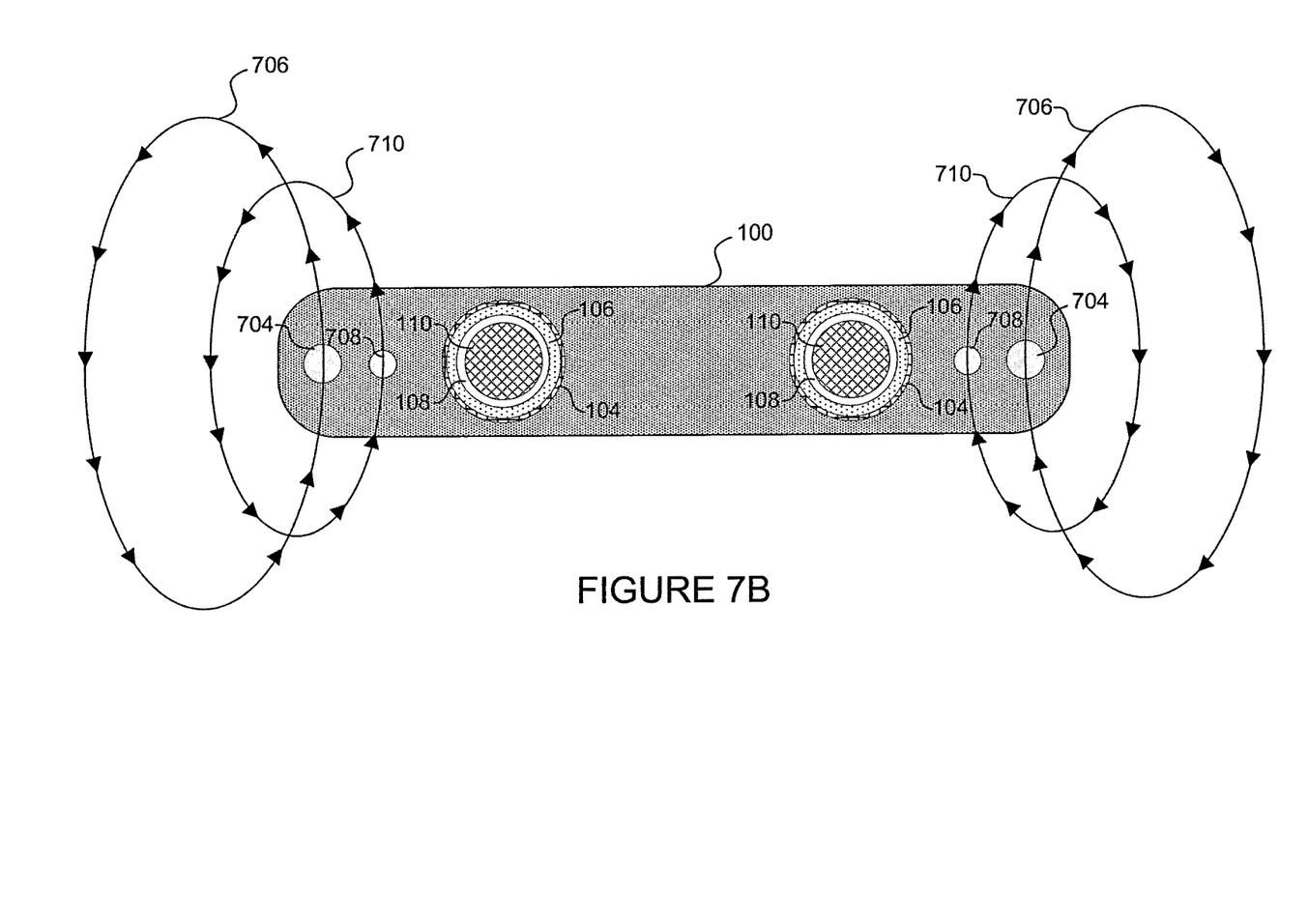
FIG. 7B is a cross-sectional view of a shark repellant surfboard according to an exemplary embodiment.

FIG. 7B illustrates a cross sectional view of a shark repellant surfboard according to an additional embodiment. The induction units of FIG. 7B are of the exemplary type shown in FIGS. 1A and 1B, but are not limited to this arrangement. Additionally, the exemplary embodiment of FIG. 7B includes antenna 704 and antenna 708, which produce electromagnetic field 706 and electromagnetic field 710, respectively. The antennas should generally output at a frequency of 20 kHz or lower. As shown in the exemplary embodiment of FIG. 7B, multiple antennas may be used depending on the preferences regarding field strength. As discussed in further detail below, the device may be configured via a controller (FIG. 8) to selectively power the antennas based on operating conditions. Furthermore, by having a loop antenna that is coplanar with the surfboard surface, the peak of the antenna radiation pattern is directed into the surrounding water. By having a low frequency field, the electromagnetic wave is best able to penetrate and propagate through seawater, which will act as a conductor.

In another embodiment, wire mesh may be integrated into body section 100 such that the electromagnetic field generated by the antennas or induced by the induction units if further optimized. For example, carbon fiber which includes interwoven conductive wire mesh may be used to cover the surfboard body section.

The power control unit of an exemplary embodiment may optionally be configured to operate in reduced output mode wherein the user desires a periodic duty cycle output of an electromagnetic field for the purposes of reducing power consumption and/or in environments in which shark attacks are unlikely. Additionally, a shark repellant surfboard of an exemplary embodiment may be configured with multiple antennas for transmitting an electromagnetic field. In this case, the exemplary power control unit may be configured to supply power to some, all, or none of the antennas while operating in a reduced power mode. The reduced power mode operation will now be explained in further detail with reference to FIG. 9.

Figure 9:
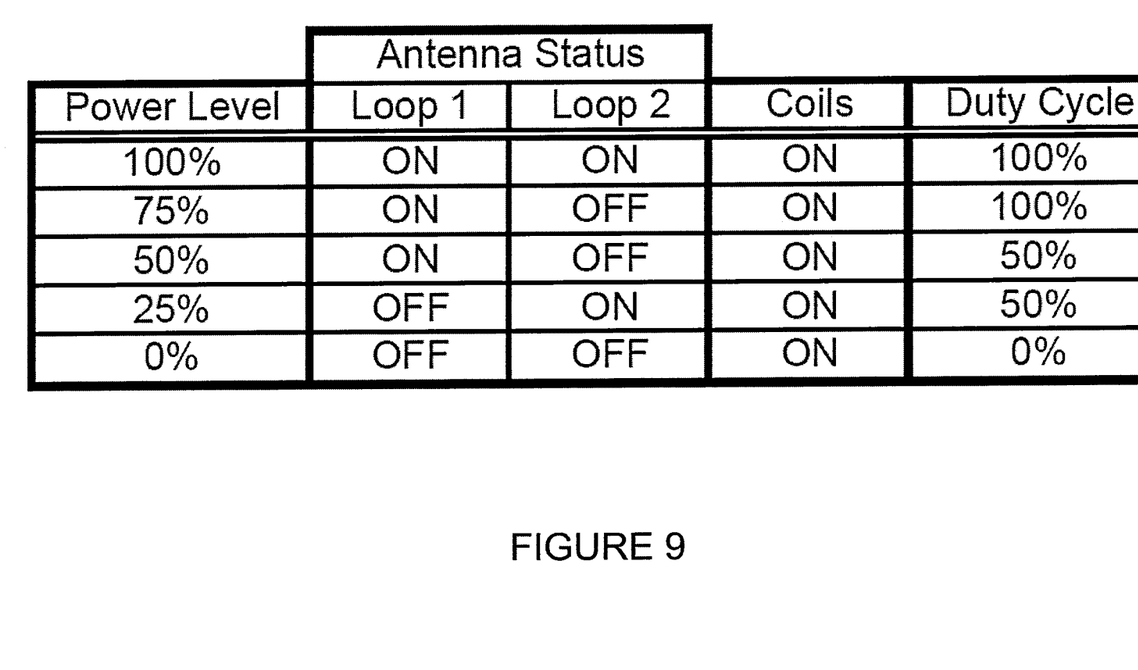
FIG. 9 is a power control unit duty cycle table according to an exemplary embodiment.

FIG. 9 illustrates a duty cycle output table used by an exemplary power control unit. This non-limiting exemplary power control unit controls the output of two loop antennas depending on the induced current and associated voltage output from the induction units, expressed as a percentage of rated output power level (shown in column 1). As shown in FIG. 9, during states of low induction, such as during calm seas, the exemplary power control unit selectively powers a set of two loop antennas, and additionally varies the duty cycle of the electromagnetic field output. As induction in the induction units increases, the surfboard is able to generate higher magnitudes of current, thereby permitting higher power consumption in an electromagnetic field transmission unit. Conversely, lower inductive states may not supply sufficient current for the exemplary device components to operate at full capacity and therefore the exemplary power control unit reduces the number of antennas being powered and the frequency at which the antennas transmit an electromagnetic pulse. However, as shown in the bottom row of FIG. 9, the induction unit coils, such as the example shown in FIG. 2A-B, are always capable of generating an electromagnetic field without outputting an induced current. The relative motion of the induction unit magnets with respect to the coils will induce an electromagnetic field without the need of a dedicated power supply. Supplying an induced current and associated voltage for powering an electromagnetic field transmission unit is merely supplementary to the induced field created by the induction units.

Figure 8:
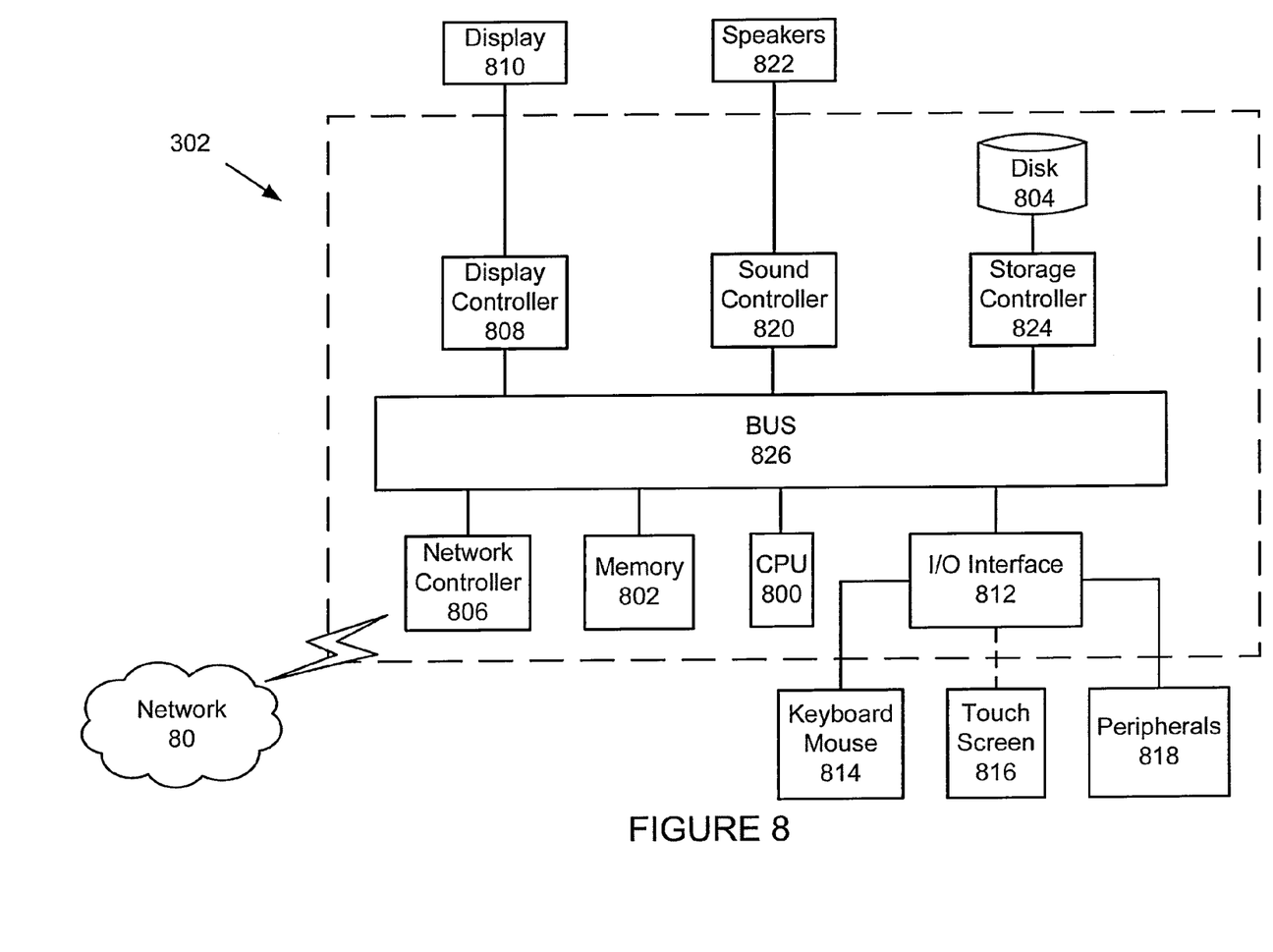
FIG. 8 is a schematic diagram of a power control unit according to an exemplary embodiment.

Next, a hardware description of power control unit 302 according to exemplary embodiments is described with reference to FIG. 8. In FIG. 8, power control unit 302 includes a CPU 800 which performs the processes described above. The process data and instructions may be stored in memory 802. These processes and instructions may also be stored on a storage medium disk X04 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer aided design station communicates, such as a server or computer.

Further, the claimed advancements may be provided as a utility application, background daemon, or component of an operating system, or combination thereof, executing in conjunction with CPU 800 and an operating system such as Microsoft Windows 7, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The power control unit 302 in FIG. 8 also includes a network controller 806, such as an Intel Ethernet PRO network interface card from Intel Corporation of America, for interfacing with network 80. As can be appreciated, the network 80 can be a public network, such as the Internet, or a private network such as an LAN or WAN network, or any combination thereof and can also include PSTN or ISDN sub-networks. The network 80 can also be wired, such as an Ethernet network, or can be wireless such as a cellular network including EDGE, 3G, and 4G wireless cellular systems. The wireless network can also be WiFi, Bluetooth, or any other wireless form of communication that is known.

Power control unit 302 may be configured to perform self diagnostics, which are output to the user or optionally to a third party (e.g., the manufacturer) via network 80.

The power control unit 302 further includes a display controller 808, such as a NVIDIA GeForce GTX or Quadro graphics adaptor from NVIDIA Corporation of America for interfacing with display 910, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in power control unit 302, such as Sound Blaster X-Fi Titanium from Creative, to interface with speakers/microphone 922 thereby providing sounds and/or music. The speakers/microphone 822 can also be used to accept dictated words as commands for controlling power control unit 302.

The general purpose storage controller 824 connects the storage medium disk 804 with communication bus 826, which may be an ISA, EISA, VESA, PCI, or similar, for interconnecting all of the components of power control unit 302. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The hardware configuration of power control unit 302 may be shielded using sheet metal, metal screen, metal foam, metallic ink, or other suitable materials.

Obviously, numerous modifications and variations of the present invention are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A surfboard with active shark repellant electronics comprising:
   a buoyant elongated body section having a planar top surface and opposing planar bottom surface which sandwich an internal portion having a cavity that is hollow;
   an induction section located within the cavity, the induction section including
   a coil winding section, the coil winding section having a hollow cylindrical insulator with an inner diameter and an outer diameter at a top and a bottom thereof, and a conductive wire forming a closed circuit around the insulator such that the conductive wire is wound, alternating from the inner diameter to the outer diameter and from top to bottom, around the surface of the insulator to form a plurality of coil windings, and
   a magnet, the magnet being located within the inner diameter of the coil winding section such that the plurality coil windings and insulator surround the magnet, wherein
   an outer circumference of the magnet is less than an inner circumference of a cavity formed by the inner diameter of the coil winding section and the plurality of coil windings such that the magnet moves freely relative to the plurality of coil windings when the surfboard is rotated about any axis; and a loop antenna formed in the elongated body and configured to transmit an electromagnetic wave at 20 kHz or less so as to repel sharks from the buoyant elongated body;
   the induction section further comprising:
   a rectifier that converts an AC input voltage to a DC output voltage, the AC input voltage being received from the coil winding section as an induced voltage created by motion of the magnet relative to the coil winding section; a battery having a battery voltage output;
   an electromagnetic field transmission unit that includes the antenna and transmits an electromagnetic field; and
   a controller including a processor programmed to measure the converted DC output voltage, determine when the converted DC output voltage exceeds a threshold voltage corresponding to a trigger voltage that generates the electromagnetic field with the electromagnetic field transmission unit,
   supply, when the converted DC output voltage is greater than or equal to the threshold voltage, the converted DC output voltage to the electromagnetic field transmission unit,
   calculate, when the converted DC output voltage exceeds the threshold voltage, an excess voltage, the excess voltage being equal to the converted DC output voltage minus the threshold voltage, and supply the excess voltage to the battery for charging the battery,
   calculate, when the converted DC output voltage is less than the threshold voltage, a compensating voltage, the compensating voltage being equal to the threshold voltage minus the converted DC output voltage, and
   supply the compensating voltage and the converted DC output voltage to the electromagnetic field transmission unit such that a sum of the compensating voltage and the converted DC output voltage equals at least the trigger voltage, wherein
   the compensating voltage is supplied by the battery.

2. The surfboard according to claim 1, wherein the controller is further programmed to: calculate a induced current output from the induction unit; and control the frequency at which the electromagnetic field transmission unit outputs an electromagnetic pulse based on the calculated current.

3. The surfboard according to claim 2, wherein the controller is further programmed to:
   control power to the antenna based on the calculated current.

4. The surfboard according to claim 1, the induction section further comprising:
   a spring portion; and
   a pendulum arm having a top end and a bottom end, the top end being connected to the spring portion and the bottom end being connected to the magnet, wherein
   the pendulum arm is suspended from the spring portion such that the magnet, in a resting position, is substantially centered within the inner diameter of the coil winding section,
   the pendulum arm is of a sufficient length to permit the magnet to swing freely in all directions within the inner diameter of the coil winding section when the surfboard is rotated about any axis.

5. The surfboard according to claim 1, wherein
   the magnet is of a cylindrical shape having a length less than the length of the insulator, the length of the magnet and the length of the insulator each extending in a direction parallel to the outer cylinder surface of the insulator; and
   the diameter of the magnet being less than a diameter formed by the insulator inner diameter and the plurality of coil windings.

6. A method for repelling sharks from a surfboard with active shark repellant electronics and including a buoyant elongated body section having a planar top surface and opposing planar bottom surface which sandwich an internal portion having a cavity that is hollow, and also including a loop antenna formed in the elongated body and configured to transmit an electromagnetic wave at 20 kHz or less so as to repel sharks from the buoyant elongated body, the method comprising:

inducing, via an induction section located within the cavity, an electromagnetic field, the induction section including     a coil winding section, the coil winding section having a hollow cylindrical insulator with an inner diameter and an outer diameter at a top and a bottom thereof, and a conductive wire forming a closed circuit around the insulator such that the conductive wire is wound, alternating from the inner diameter to the outer diameter and from top to bottom, around the surface of the insulator to form a plurality of coil windings, and     a magnet, the magnet being located within the inner diameter of the coil winding section such that the plurality coil windings and insulator surround the magnet, wherein     an outer circumference of the magnet is less than an inner circumference of a cavity formed by the inner diameter of the coil winding section and the plurality of coil windings such that the magnet moves freely relative to the plurality of coil windings when the surfboard is rotated about any axis,     converting an AC input voltage to a DC output voltage, the AC input voltage being received from the coil winding section as an induced voltage created by motion of the magnet relative to the coil winding section;

generating a backup DC voltage via a battery; determining when the converted DC output voltage exceeds a threshold voltage corresponding to a trigger voltage that generates the electromagnetic field with an electromagnetic field transmission unit, the electromagnetic field transmission unit including the antenna;

supplying, when the DC output voltage is greater than or equal to the threshold voltage, the converted DC output voltage to the electromagnetic field transmission unit;

calculating, when the converted DC output voltage exceeds the threshold voltage, an excess voltage, the excess voltage being equal to the converted DC output voltage minus the threshold voltage, and supplying the excess voltage to the battery for charging the battery;

calculating, when the converted DC output voltage is less than the threshold voltage, a compensating voltage, the compensating voltage being equal to the threshold voltage minus the converted DC output voltage; and     supplying the compensating voltage and the converted DC output voltage to the electromagnetic field transmission unit such that a sum of the compensating voltage and the converted DC output voltage equals at least the trigger voltage, wherein the compensating voltage is supplied by the battery.

7. The method according to claim 6, further comprising: calculating an induced current output from the induction section; and     controlling the frequency at which the electromagnetic field transmission unit outputs an electromagnetic pulse based on the calculated current.

8. The method according to claim 7, further comprising: controlling power to the antenna based on the calculated current.

\* \* \* \* \*